(No Model.)

M. A. MURPHY.
NUT LOCK.

No. 597,823. Patented Jan. 25, 1898.

Witnesses
Geo. W. Byrne
Victor J. Evans

Inventor
Michael A. Murphy
By John Wedderburn
Attorney

UNITED STATES PATENT OFFICE.

MICHAEL A. MURPHY, OF BROOKLYN, NEW YORK.

NUT-LOCK.

SPECIFICATION forming part of Letters Patent No. 597,823, dated January 25, 1898.

Application filed July 12, 1897. Serial No. 644,337. (No model.)

*To all whom it may concern:*

Be it known that I, MICHAEL A. MURPHY, of Brooklyn, in the county of Kings and State of New York, have invented certain new and useful Improvements in Nut-Locks; and I do hereby declare the following to be a full, clear, and exact description of the invention, such as will enable others skilled in the art to which it appertains to make and use the same.

This invention relates to improvements in nut-locks, and has more particular relation to nut-locks of the split-nut type.

The invention consists of the combination, with a nut proper having a screw-threaded extension formed with a longitudinal slot and a transverse slot communicating with the longitudinal slot at right angles thereto, of a locking-nut applied on said screw-threaded portion so as to compress the same upon a bolt and thus lock the nut in position.

The invention also consists of certain other novel constructions, combinations, and arrangements of parts, all of which will be hereinafter more particularly set forth and claimed.

Figure 1:
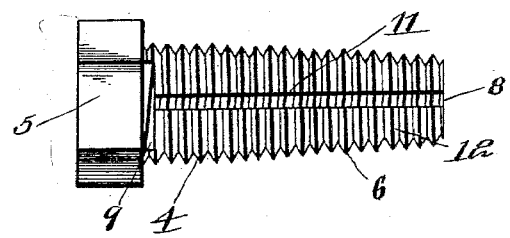
Figure 2:
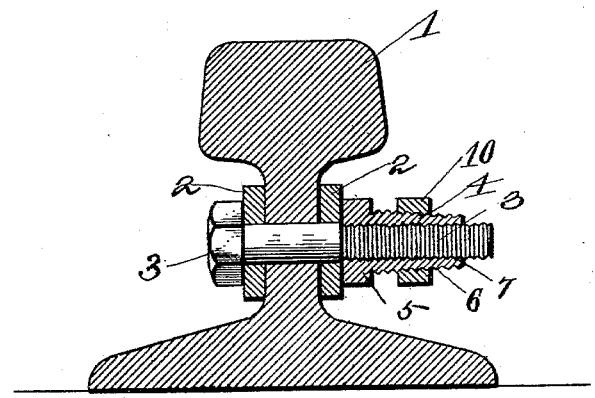

In the accompanying drawings, forming part of this specification, Figure 1 represents a side elevation of a nut-lock embodying my invention, and Fig. 2 represents a central vertical longitudinal section of the same applied in position upon the fish-plates of a rail-joint.

1 in the drawings represents the rail; 2 2, the fish-plates; 3, the bolt, and 4 my improved nut-lock. This latter comprises a nut proper, 5, of any suitable structure and formed with a tapering extension 6, said nut and extension being formed with a screw-threaded longitudinal passage 7 for the reception of the bolt 3. Said tapering extension portion 6 is provided with a longitudinal slot 8 and a transverse slot 9, extending to each side of the inner end of said slot 8. A suitable locking-nut 10 is adapted to be applied on the extension portion 6 and compress the same upon the bolt 3, and thus lock said nut 5 firmly in position.

It will be observed from the foregoing description that the peculiar structure of the slots 8 and 9 forms in effect two wings 11 and 12, located upon the respective sides of the slot 8. These wings will readily give to be compressed upon the bolt 3 to lock the nut 4 firmly in position after it has been turned up against the fish-plate 2. By the tapering structure of the extension 6 the nut 10 compresses said extension as it is screwed forward thereon, and the peculiar structure of the wings 11 and 12 permits of said nut being moved forward until it tightly jams said wings against the bolt 3.

I do not care to limit myself to the application of my invention to joining bolts for the fish-plates of rails, as my improved nut-lock may be applied in any position where it is desired to secure a nut firmly against any accidental rotation.

Having thus described my invention, what I claim as new, and desire to secure by Letters Patent, is—

1. In a nut-lock, the combination with a nut proper having a screw-threaded extension formed with a longitudinal slot and a transverse slot communicating with the longitudinal slot, of a locking-nut applied over said screw-threaded extension, substantially as described.

2. In a nut-lock, the combination with a nut proper having a tapering screw-threaded extension formed with a longitudinal slot and a transverse slot communicating therewith, of a locking-nut applied over said screw-threaded extension, substantially as described.

3. In a nut-lock, the combination with a nut proper having a screw-threaded extension formed with a longitudinal slot and a transverse slot extending to each side of the inner end of the longitudinal slot, of a locking-nut applied over said screw-threaded extension, substantially as described.

In testimony whereof I have signed this specification in the presence of two subscribing witnesses.

MICHAEL A. MURPHY.

Witnesses:
FRANCIS S. COYLE,
LOUIS PFAUS.